US012701276B2

(12) United States Patent
Zeng

(10) Patent No.: US 12,701,276 B2
(45) Date of Patent: Aug. 4, 2026

(54) VIDEO GENERATION SYSTEM AND METHOD AND RELATED APPARATUS

(71) Applicant: Huawei Technologies Co., Ltd., Shenzhen (CN)

(72) Inventor: Yihang Zeng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 109 days.

(21) Appl. No.: 18/749,856

(22) Filed: Jun. 21, 2024

(65) Prior Publication Data

US 2024/0348844 A1      Oct. 17, 2024

Related U.S. Application Data

(63) Continuation of application No. PCT/CN2022/140279, filed on Dec. 20, 2022.

(30) Foreign Application Priority Data

Dec. 22, 2021    (CN) .......................... 202111580204.3

(51) Int. Cl.
| | |
|---|---|
| *H04N 21/234* | (2011.01) |
| *H04N 21/431* | (2011.01) |
| *H04N 21/475* | (2011.01) |
| *H04N 21/845* | (2011.01) |

(52) U.S. Cl.
CPC ... *H04N 21/23424* (2013.01); *H04N 21/4312* (2013.01); *H04N 21/4318* (2013.01); *H04N 21/4756* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 9,996,750 B2 | 6/2018 | Campbell | |
| 2011/0256886 A1* | 10/2011 | Velusamy ............... | G01S 19/24 455/456.1 |
| 2014/0092131 A1* | 4/2014 | Deng ...................... | G06F 3/017 345/632 |
| 2015/0286361 A1* | 10/2015 | Puri ...................... | H04L 65/762 715/719 |
| 2017/0150237 A1* | 5/2017 | Minamino ......... | H04N 21/4223 |
| 2017/0230606 A1* | 8/2017 | Hundemer ......... | H04N 21/4622 |
| 2019/0303683 A1* | 10/2019 | Pearson .................... | G06T 7/60 |
| 2020/0089696 A1* | 3/2020 | Minarik ................ | G06F 16/29 |
| 2024/0147023 A1* | 5/2024 | Zhou .................... | H04N 21/816 |

\* cited by examiner

*Primary Examiner* — Alexander Q Huerta

(74) *Attorney, Agent, or Firm* — Conley Rose, P.C.

(57) ABSTRACT

When a geographical location of a first electronic device meets a first preset condition, a first electronic device obtains data of a video and/or images shot in real time. The first electronic device selects a part of pictures in the video and/or images shot in real time. When the geographical location of the first electronic device meets a second preset condition, the first electronic device generates a first video formed by splicing the part of pictures.

20 Claims, 10 Drawing Sheets

VIDEO GENERATION SYSTEM AND METHOD AND RELATED APPARATUS

CROSS-REFERENCE TO RELATED APPLICATIONS

This is a continuation of International Patent Application No. PCT/CN2022/140279, filed on Dec. 20, 2022, which claims priority to Chinese Patent Application No. 202111580204.3, filed on Dec. 22, 2021. The disclosures of the aforementioned applications are hereby incorporated by reference in their entireties.

TECHNICAL FIELD

This disclosure relates to the field of electronic technologies, and in particular, to a video generation system and method and a related apparatus.

BACKGROUND

The mobile phone may edit and splice pictures or videos in a period of time or under a theme in pictures or videos saved in an album, to automatically generate a new video (which may also be referred to as a vlog). The new video may be a highlight review within a period of time, for example, a highlight review of a weekend or a highlight review of a holiday; or may be highlight moments under a theme, for example, highlight moments under a sports theme, highlight moments under a travel theme, or highlight moments under a graduation theme.

Currently, a process of generating a video of highlight moments in an album needs to be completed when an electronic device is charged and a screen is off. When a data volume is large, analysis time is long. If there are a large quantity of photos/videos, a user waits for a long time. In addition, during a travel, there is often a transient beautiful scenery, and the user wants to take a photo or record a video, but the user does not have time to take a photo or record a video. Therefore, how to improve video generation efficiency and reduce waiting time of the user is a problem that is being studied by a person skilled in the art.

SUMMARY

Embodiments of this disclosure provide a video generation system and method and a related apparatus, to synchronously analyze and edit a video shot in real time. This improves video generation efficiency and reduces waiting time of a user.

According to a first aspect, this disclosure provides a video generation method, where a first electronic device determines that geographical location information of the first electronic device meets a first preset condition. The first electronic device obtains a video and/or images shot in real time. The first electronic device selects a part of pictures in the video and/or images shot in real time. When the geographical location information of the first electronic device meets a second preset condition, the first electronic device generates a first video, where the first video is formed by splicing the part of pictures.

In this embodiment, the first electronic device determines, based on a geographical location of the first electronic device, analysis start time and analysis end time of a video and/or images. When the geographical location of the first electronic device meets the first preset condition, the first electronic device starts to analyze and edit data of the video and/or images shot in real time by another electronic device (for example, a second electronic device), to select a part of pictures in the video and/or images shot in real time. That is, the another electronic device shoots the video, and the first electronic device synchronously performs picture selection on the video. When the geographical location of the first electronic device meets the second preset condition, the first electronic device generates the first video, and no longer analyzes and edits the video and/or images that are subsequently shot. The first video is obtained by splicing the part of selected pictures. In this manner of synchronously analyzing the video and/or images shot in real time, video generation efficiency can be improved, and waiting time of a user can be reduced.

Based on the first aspect, in a possible implementation, the first preset condition includes that a current geographical location of the first electronic device leaves a user resident area. Alternatively, a current geographical location of the first electronic device leaves a user resident area, and leave duration exceeds a first threshold. Alternatively, a shortest distance between a current geographical location of the first electronic device and a preset location is greater than or equal to a second threshold, and the preset location includes a user resident area. Alternatively, a current geographical location of the first electronic device enters a particular area. The first preset condition determines an occasion at which the first electronic device starts to analyze the video and/or images. When the first electronic device determines that the geographical location information of the first electronic device meets the first preset condition, the first electronic device starts to perform synchronous analysis on the video and/or images shot in real time. In this embodiment, the first preset condition is related to the geographical location information of the first electronic device, and may be applicable to an application scenario in which a user travels out and a travel video is generated.

Based on the first aspect, in a possible implementation, the video and/or images are shot in real time by using the second electronic device. Optionally, the video and/or images may be shot in real time by using the first electronic device. Optionally, the video and/or images may be shot in real time by using a plurality of electronic devices.

Based on the first aspect, in a possible implementation, that the first electronic device selects a part of pictures in the video and/or images shot in real time includes the first electronic device segmenting the obtained video and/or images. The first electronic device scores, based on an aesthetic scoring algorithm, the segmented video and/or images, and selects a picture with a highest score in each segment of the segmented video and/or images, where the part of pictures include the picture with the highest score in each segment of the segmented video and/or images.

In a possible implementation, a score weight of the aesthetic scoring algorithm is associated with a scene type of the segmented video and/or images. A scoring rule of aesthetic scoring may change based on a change of a scene type of a video picture. Each time the first electronic device obtains a video segment through division, the first electronic device determines a scene type of the video segment based on a current geographical location of the first electronic device or an image recognition technology, to determine a scoring rule corresponding to the scene type. In this way, customized aesthetic scoring is performed based on accurate scenario classification. This can select a picture clip closest to public aesthetics, and improve user experience.

Based on the first aspect, in a possible implementation, the second preset condition includes that a current geographical location of the first electronic device enters a preset location. Alternatively, remaining time from a current geographical location of the first electronic device to a preset location is less than a fifth threshold. The second preset condition determines an occasion at which the first electronic device ends analyzing the video and/or images. The first electronic device may generate the first video when the second preset condition is met, without waiting for long-time background analysis. In this embodiment, the second preset condition is related to the geographical location information of the first electronic device, and may be applicable to an application scenario in which a user travels out and a travel video is generated.

Based on the first aspect, in a possible implementation, after that the first electronic device generates a first video, the method further includes the first electronic device outputting first prompt information, where the first prompt information is used to provide an editing mode for the first video, and the editing mode includes one or more of playing the first video, saving the first video, deleting the first video, adjusting a sequence of display pictures in the first video, deleting a part of the display pictures in the first video, inserting a transition animation between the display pictures in the first video, adding a text, a sticker, or a watermark on the display pictures in the first video, and adding background music to the first video.

Based on the first aspect, in a possible implementation, the method further includes the first electronic device generating a video name of the first video based on the geographical location information of the first electronic device or video content of the first video. Here, this resolves a current problem that a name of a video in an album in a gallery is monotonous, and enriches an ecosystem of recording life for a user in the gallery.

Based on the first aspect, in a possible implementation, the method further includes the first electronic device sending the first video to a third electronic device, where the third electronic device includes the second electronic device.

According to a second aspect, this application provides a video generation system, including a first electronic device and a second electronic device. The first electronic device establishes a connection to the second electronic device.

The second electronic device is configured to shoot a video and/or an image.

The first electronic device is configured to determine that geographical location information of the first electronic device meets a first preset condition.

The first electronic device is further configured to obtain a video and/or images shot in real time by the second electronic device.

The first electronic device is further configured to select a part of pictures in the video and/or images.

The first electronic device is further configured to: when the geographical location information of the first electronic device meets a second preset condition, generate a first video, where the first video is formed by splicing the part of pictures.

In this embodiment, the first electronic device establishes the connection to the second electronic device, and the second electronic device may shoot a video/image at any time. The first electronic device determines, based on a geographical location of the first electronic device, analysis start time and analysis end time of a video and/or images. When the geographical location of the first electronic device meets the first preset condition, the first electronic device starts to analyze and edit data of the video and/or images shot in real time by the second electronic device, to select a part of pictures in the video and/or images shot in real time. That is, the second electronic device shoots the video, and the first electronic device synchronously performs picture selection on the video. When the geographical location of the first electronic device meets the second preset condition, the first electronic device generates the first video, and no longer analyzes and edits the video and/or images that are subsequently shot. The first video is obtained by splicing the part of selected pictures. In this manner of synchronously analyzing a video and/or images shot in real time, video generation efficiency can be improved, and waiting time of a user can be reduced.

Based on the second aspect, in a possible implementation, the first preset condition includes that a current geographical location of the first electronic device leaves a user resident area. Alternatively, a current geographical location of the first electronic device leaves a user resident area, and leave duration exceeds a first threshold. Alternatively, a shortest distance between a current geographical location of the first electronic device and a preset location is greater than or equal to a second threshold, and the preset location includes a user resident area. Alternatively, a current geographical location of the first electronic device enters a particular area. The first preset condition determines an occasion at which the first electronic device starts to analyze the video and/or images. When the first electronic device determines that the geographical location information of the first electronic device meets the first preset condition, the first electronic device starts to perform synchronous analysis on the video and/or images shot in real time. In this embodiment, the first preset condition is related to the geographical location information of the first electronic device, and may be applicable to an application scenario in which a user travels out and a travel video is generated.

Based on the second aspect, in a possible implementation, that the first electronic device is further configured to select a part of pictures in the video and/or images shot in real time includes the first electronic device being further configured to segment the obtained video and/or images. The first electronic device is further configured to score, based on an aesthetic scoring algorithm, the segmented video and/or images, and select a picture with a highest score in each segment of the segmented video and/or images, where the part of pictures include the picture with the highest score in each segment of the segmented video and/or images.

In a possible implementation, a score weight of the aesthetic scoring algorithm is associated with a scene type of the segmented video and/or images. A scoring rule of aesthetic scoring may change based on a change of a scene type of a video picture. Each time the first electronic device obtains a video segment through division, the first electronic device determines a scene type of the video segment based on a current geographical location of the first electronic device or an image recognition technology, to determine a scoring rule corresponding to the scene type. In this way, customized aesthetic scoring is performed based on accurate scenario classification. This can select a picture clip closest to public aesthetics, and improve user experience.

Based on the second aspect, in a possible implementation, the second preset condition includes a current geographical location of the first electronic device entering a preset location. Alternatively, remaining time from a current geographical location of the first electronic device to a preset location is less than a fifth threshold. The second preset condition determines an occasion at which the first electronic device ends analyzing the video and/or images. The first electronic device may generate the first video when the second preset condition is met, without waiting for long-time background analysis. In this embodiment, the second preset condition is related to the geographical location information of the first electronic device, and may be applicable to an application scenario in which a user travels out and a travel video is generated.

Based on the second aspect, in a possible implementation, the first electronic device is further configured to output first prompt information after generating the first video, where the first prompt information is used to provide an editing mode for the first video, and the editing mode includes one or more of playing the first video, saving the first video, deleting the first video, adjusting a sequence of display pictures in the first video, deleting a part of the display pictures in the first video, inserting a transition animation between the display pictures in the first video, adding a text, a sticker, or a watermark on the display pictures in the first video, and adding background music to the first video.

Based on the second aspect, in a possible implementation, the first electronic device is further configured to generate a video name of the first video based on the geographical location information of the first electronic device or video content of the first video. Here, this resolves a current problem that a name of a video in an album in a gallery is monotonous, and enriches an ecosystem of recording life for a user in the gallery.

Based on the second aspect, in a possible implementation, the first electronic device is further configured to send the first video to the second electronic device.

Based on the second aspect, in a possible implementation, the second electronic device is further configured to receive the first video. The second electronic device is further configured to output second prompt information, where the second prompt information is used to provide an editing mode for the first video, and the editing mode includes one or more of playing the first video, deleting the first video, adjusting a sequence of display pictures in the first video, deleting a part of the display pictures in the first video, inserting a transition animation between the display pictures in the first video, adding a text, a sticker, or a watermark on the display pictures in the first video, and adding background music to the first video.

According to a third aspect, this disclosure provides an electronic device, including one or more processors and one or more memories. The one or more memories are coupled to the one or more processors. The one or more memories are configured to store computer program code, and the computer program code includes computer instructions. When the computer instructions are run on the processor, the electronic device is enabled to perform the video generation method in any possible implementation of any one of the foregoing aspects.

According to a fourth aspect, this disclosure provides a server, including one or more processors and one or more memories. The one or more memories are coupled to the one or more processors. The one or more memories are configured to store computer program code, and the computer program code includes computer instructions. When the computer instructions are run on the processor, an electronic device is enabled to perform the video generation method in any possible implementation of any one of the foregoing aspects.

According to a fifth aspect, an embodiment provides a computer storage medium, including computer instructions. When the computer instructions are run on an electronic device, a communication apparatus is enabled to perform the video generation method according to any one of the possible implementations of any one of the foregoing aspects.

According to a sixth aspect, an embodiment provides a computer program product.

When the computer program product runs on a computer, the computer is enabled to perform the video generation method according to any possible implementation of the foregoing aspects.

DESCRIPTION OF EMBODIMENTS

Figure 1:
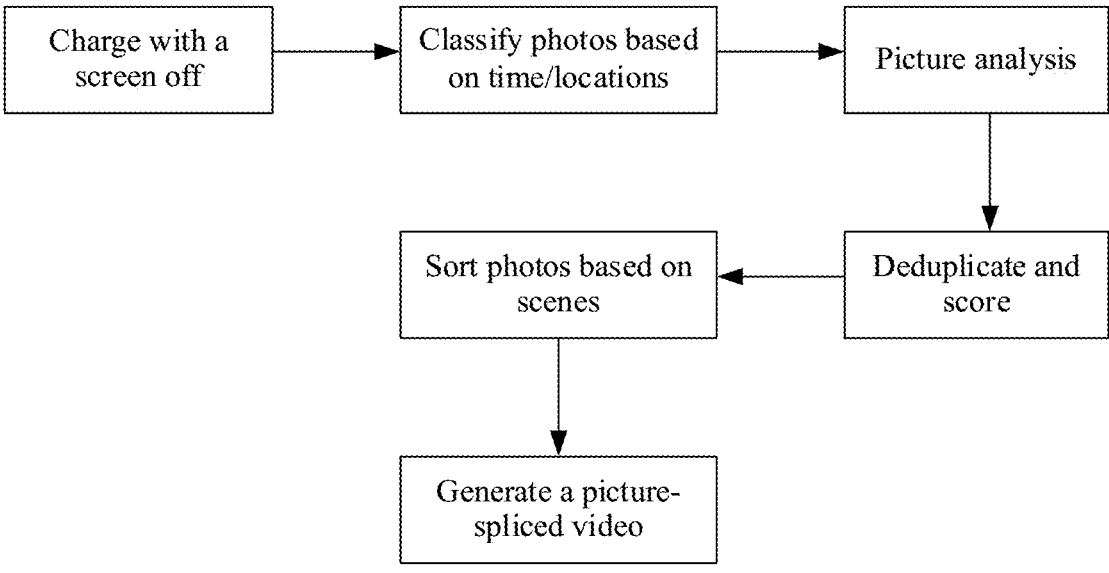
FIG. 1 is a flowchart of steps of automatically generating a picture-spliced video according to an embodiment.

The following describes technical solutions in embodiments of this disclosure with reference to accompanying drawings. In the descriptions of embodiments, unless otherwise stated, "/" indicates or, for example, A/B may indicate A or B. "And/or" merely describes an association relationship between associated objects, and indicates that three relationships may exist. For example, A and/or B may indicate that there are three cases: Only A exists, both A and B exist, and only B exists. In addition, in the descriptions of embodiments of this disclosure, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise specified, "a plurality of" means two or more than two. Directions or positional relationships indicated by terms "middle", "left", "right", "up", "down", and the like are directions or positional relationships that are shown based on the accompanying drawings, and are merely used to describe embodiments easily and simplify the description, rather than indicate or imply that an indicated apparatus or component needs to have a specific orientation or needs to be constructed and operated in the specific orientation, and therefore cannot be understood as a limitation of this disclosure.

An electronic device in embodiments of this disclosure may be a mobile phone, a tablet computer, a desktop computer, a laptop computer, a notebook computer, an ultra-mobile personal computer (UMPC), a handheld computer, a netbook, a personal digital assistant (PDA), also referred to as a palmtop computer, a virtual reality device, a portable internet device, a data storage device, a wearable device (for example, a wireless headset, a smart watch, a smart band, smart glasses, a head-mounted display (HMD), electronic clothing, an electronic bracelet, an electronic necklace, an electronic accessory, an electronic tattoo, and a smart mirror), a vehicle, a head unit, a vehicle-mounted terminal (for example, a smart screen, an in-vehicle camera, or a display), a camera, various electronic devices with a camera, and the like.

The following describes technical keywords in embodiments of this disclosure.

Image aesthetic scoring is scoring an image based on an aesthetic scoring algorithm. For an image aesthetic scoring algorithm, some quantized image aesthetic rules, for example, distribution of important features in a picture of a shot image, may be used. These aesthetic scoring rules may come from experience summarization. Common aesthetic scoring rules include, for example, a trichotomy, a principal diagonal principle, visual balance, and determining a proportion of a photographed subject in a picture. There may be different image aesthetic rules based on different requirements. An aesthetic score $E_i$ may be calculated according to each rule. A final aesthetic score of an image may be an aesthetic score calculated according to any rule, or may be a weighted average of aesthetic scores calculated according to a plurality of rules, that is, $E=\Sigma w_i E_i$, where $w_i$ indicates a weight. An aesthetic score under each rule may be represented as $E_i=g(S_i, F_i)$, where $S_i$ describes a size and a location of a photographed subject, $F_i$ describes distribution of main features in an image picture, and g is a user-defined function (for example, a Gaussian function).

Video aesthetic scoring is similar to image aesthetic scoring. An image frame is extracted from a video, and an aesthetic score of a video may be a weighted average of aesthetic scores of a plurality of image frames in the video.

An application scenario in embodiments of this disclosure is described below by using an example.

The mobile phone may edit and splice pictures or videos saved in an album, pictures or videos in a period of time or under a theme, to automatically generate a new video (which may also be referred to as a vlog). The new video may be a highlight review within a period of time, for example, a highlight review of a weekend or a highlight review of a holiday; or may be highlight moments under a theme, for example, highlight moments under a sports theme, highlight moments under a travel theme, or highlight moments under a graduation theme.

In some application scenarios, in a process in which a user drives a car, another user on the car may photograph a surrounding environment scenery as a record. If the user wants to obtain a new processed video based on shot pictures or a shot video, the user needs to perform manual editing and splicing. Alternatively, the processed video may be automatically generated by a mobile phone. Currently, a mobile phone automatically generates a picture-spliced video after time and location clustering, scene classification, and aesthetic scoring are performed on images in an album of a user when a screen is off during charging. After taking photos by using the mobile phone, the user needs to charge the mobile phone and turn off the screen for a period of time. After time and location clustering, smart classification, and artistic cover generation are performed on the photos in the album, a picture video including several photos may be obtained.

For example, FIG. 1 shows a step procedure of automatically generating a picture-spliced video. When an electronic device detects that the electronic device is currently in a charging and screen-off state, the electronic device classifies photos saved in an album. A classification manner may be based on time and/or locations. For example, time-based classification may be classifying photos saved by the electronic device within one week into one type, or photos saved by the electronic device within one weekend into one type. For example, location-based classification may be classifying photos saved in a same location by the electronic device into one type. For example, time and location-based classification may be classifying photos saved by the electronic device in a same location on one weekend into one type. The electronic device performs picture analysis on a plurality of photos classified into one type, deduplicates the plurality of photos, scores the plurality of photos based on an algorithm, filters out one of two photos with a high repetition rate, filters out a photo with a low score, to obtain a plurality of final photos, sorts the plurality of photos, and arranges photos of a same scene in the plurality of photos together, to generate a final picture-spliced video. The video may be named based on time or the scene, for example, "Weekend easy time", or "The weekends".

Because a special scene or a special moment strongly depends on an intelligence capability, and most photos of a user are about weekend trips, generated album videos are mostly videos of moments without a scene. A large quantity of videos of moments without a scene have repeated and monotonous names. In addition, the foregoing manner needs to be completed when the electronic device is charged and a screen is off. When there is a large amount of data, analysis takes a long time. When there are a large quantity of photos, the user waits for a long time.

Embodiments of this disclosure provide a video generation manner. An electronic device can synchronously analyze a video that is being shot in real time, and edit the video. In this way, a problem that a user waits for a long time in the foregoing scenario can be resolved. In a process of driving a car by the user, another user on the car may photograph a surrounding environment scenery as a record. After a recorded video ends, the user may immediately obtain a new clipped and spliced video.

Figure 2:
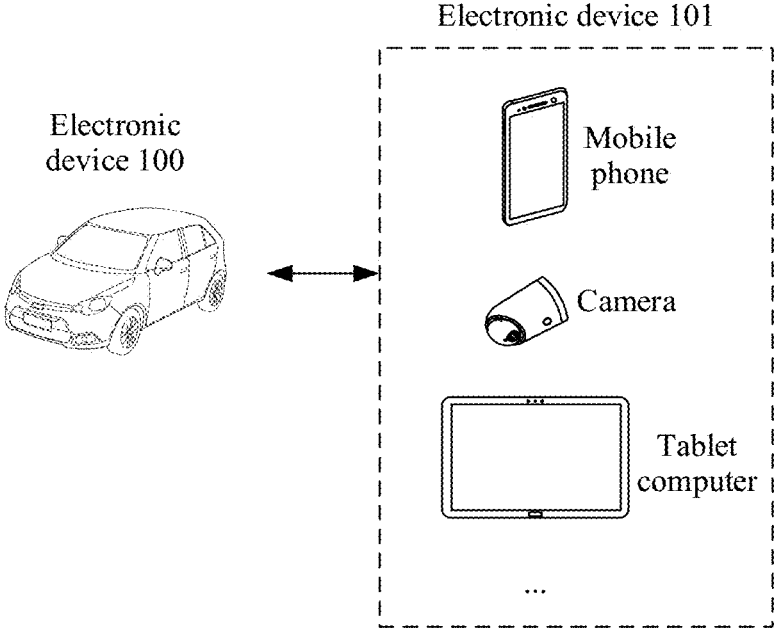
FIG. 2 is a schematic diagram of an architecture of a video generation system according to an embodiment.

FIG. 2 shows a system architecture of a video generation system according to an embodiment. As shown in FIG. 2, the video generation system includes an electronic device 100 and one or more electronic devices 101. The electronic device 100 and the electronic device 101 may be connected in a wired or wireless communication manner. The wireless communication manner may include, for example, BLUETOOTH (BT), near field communication (NFC), wireless fidelity (Wi-Fi), or Wi-Fi direct connection. The one or more electronic devices 101 include electronic devices having a camera, like a camera lens, a camera, a tablet computer, an iPad, or a mobile phone. Optionally, an application that supports a video generation technology is installed and run on the electronic device 100. The application may be a photographing application or a video processing application.

In this embodiment, the electronic device 101 shoots a video, the electronic device 100 may obtain video data in real time in a process of shooting the video by the electronic device 101, and the electronic device 100 analyzes and edits the video data obtained in real time. That is, the electronic device 101 shoots the video, and the electronic device 100 synchronously analyzes and edits the video. When the electronic device 101 finishes shooting the video, the electronic device 100 may obtain a new video that is edited. In this way, video generation efficiency can be improved, and user waiting time can be reduced. For example, the electronic device 100 is a head unit, and the electronic device 101 may be a device having a camera, like an in-vehicle camera or a mobile phone. When a user drives a vehicle connected to the electronic device 101, the electronic device 101 may shoot a roadside scenery in a driving process in real time. In this case, the electronic device 100 may synchronously analyze and edit a video or pictures shot in real time. After the driving ends, the electronic device 100 may generate a travel video about the driving process. In addition, the electronic device 100 may share the generated travel video to another electronic device (including the electronic device 101).

In some embodiments, the electronic device 100 and the electronic device 101 may perform data communication by using a server, and the server is configured to provide a background service for an application that supports a video generation technology. The server may be an application server, a cloud server, a background server, or the like. The server may alternatively be a cloud computing platform, a virtualization center, or the like, and includes a device configured to access a wide area network, for example, a base station, a broadband remote access server (BRAS), an optical network unit, a broadband network gateway (BNG), or an aggregation switch.

In some embodiments, the electronic device 100 and the electronic device 101 are devices that log in to a same account, or accounts that the electronic device 100 and the electronic device 101 log in to are associated accounts of each other, where the associated accounts may be accounts authorized by a same account. Optionally, the account herein may be an application account, a device account, an identity account, or the like.

The following first describes the electronic device 100 in embodiments of this disclosure.

Figure 3A:
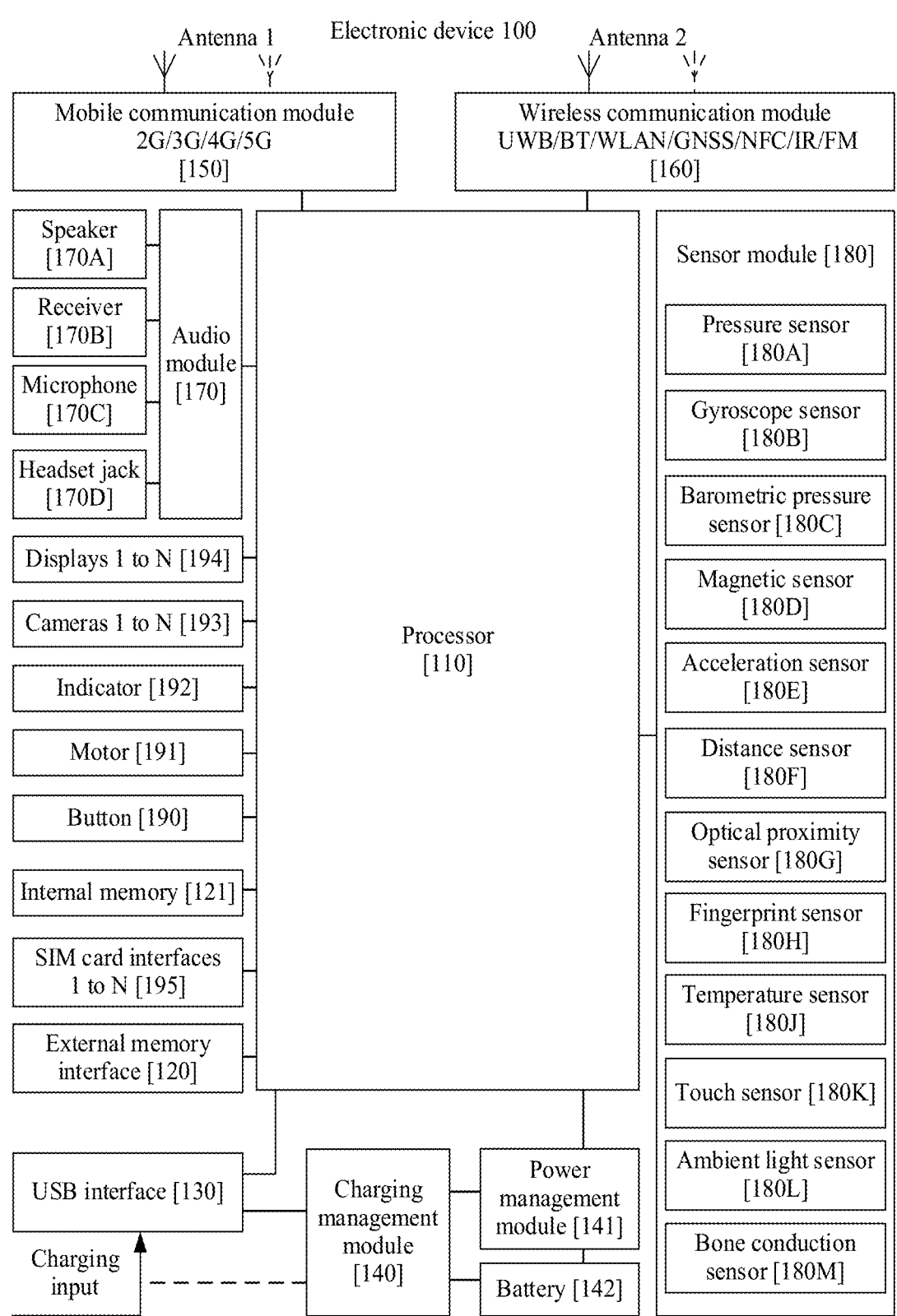
FIG. 3A is a schematic diagram of a structure of an electronic device according to an embodiment.

FIG. 3A is a schematic diagram of a structure of an example of the electronic device 100 according to an embodiment.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in embodiments does not constitute a specific limitation on the electronic device 100. In some other embodiments, the electronic device 100 may include more or fewer components than the components shown in the figure, some components may be combined, or some components may be split, or different component arrangements may be used. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may save an instruction or data that is just used or cyclically used by the processor 110. If the processor 110 needs to use the instructions or the data again, the processor may directly invoke the instructions or the data from the memory. This avoids repeated access, shortens a waiting time of the processor 110, and therefore improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, a USB interface, and the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used to perform audio communication, and sample, quantize, and encode an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a BLUETOOTH function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 via the CSI, to implement a photographing function of the electronic device 100. The processor 110 communicates with the display 194 via the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that conforms to a USB standard specification, and may be a mini USB interface, a micro USB interface, a USB type-C interface, or the like. The USB interface 130 may be configured to connect to a charger to charge the electronic device 100, or may be configured to transmit data between the electronic device 100 and a peripheral device, or may be configured to connect to a headset to play audio through the headset. The interface may be further configured to connect to another electronic device such as an augmented reality (AR) device.

It may be understood that an interface connection relationship between modules illustrated in embodiments is only an example for description, and does not constitute a limitation on the structure of the electronic device 100. In some other embodiments, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives input of the battery 142 and/or the charging management module 140, to supply power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance).

In some other embodiments, the power management module 141 may alternatively be disposed in the processor 110. In some other embodiments, the power management module 141 and the charging management module 140 may also be disposed in a same component.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to: transmit and receive electromagnetic wave signals. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, an antenna may be used in combination with a tuning switch.

The mobile communication module 150 may provide a wireless communication solution that includes second, third, fourth, fifth generation (2G, 3G, 4G, 5G), and the like and that is applied to the electronic device 100. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in the same component as the mobile communication module 150 or another function module.

The wireless communication module 160 may provide a solution applied to the electronic device 100, to wireless communication including ultra-wide band (UWB) communication, a wireless local area network (WLAN) (for example, a Wi-Fi network, BLUETOOTH, a global navigation satellite system (GNSS), frequency modulation (FM), near field communication (NFC), and an infrared (IR) technology. The wireless communication module 160 may be one or more components integrating at least one communication processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communication (GSM), a general packet radio service (GPRS), code-division multiple access (CDMA), wideband code-division multiple access (WCDMA), time-division code-division multiple access (TD-SCDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BeiDou navigation satellite system (BDS), a quasi-zenith satellite system (QZSS), and/or a satellite based augmentation system (SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device 100 may include one or N displays 194, where N is a positive integer greater than 1.

In some embodiments, the display 194 displays interface content currently output by a system. For example, the interface content is an interface provided by an instant messaging application.

The electronic device 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further optimize the image noise and luminance. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as red, blue, green (RGB) or luma, blue projection, red projection (YUV). In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to: compress or decompress a digital video. The electronic device 100 may support one or more video codecs. Therefore, the electronic device 100 may play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a transmission mode between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be used to connect to an external storage card, for example, a micro secure digital (SD) card, to extend a storage capability of the electronic device 100. The external memory card communicates with the processor 110 through the external memory interface 120, to implement a data storage function. For example, files such as music and videos are saved in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (UFS).

The electronic device 100 may implement an audio function like music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "horn", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB interface 130, or may be a 3.5 mm Open Mobile Terminal Platform (OMTP) standard interface or CTIA standard interface.

The pressure sensor 180A is configured to sense a pressure signal, and may convert the pressure signal into an electrical signal. In some embodiments, the pressure sensor 180A may be disposed on the display 194. In some optional embodiments, the pressure sensor 180A may be configured to: capture a pressure value generated when a finger part of the user touches the display, and transmit the pressure value to the processor, so that the processor identifies a finger part through which the user inputs the user operation.

There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, different touch positions may correspond to different operation instructions. In some optional embodiments, the pressure sensor 180A may further calculate a quantity of touch points based on a detected signal, and transmit a calculated value to the processor, so that the processor identifies that the user inputs a user operation through a single finger or a plurality of fingers.

The gyroscope sensor 180B may be configured to determine a moving posture of the electronic device 100. In some embodiments, an angular velocity of the electronic device 100 around three axes (namely, axes X, Y, and Z of the electronic device) may be determined through the gyro sensor 180B. The gyroscope sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may also be used in a navigation scenario and a somatic game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking of the flip cover is set based on a detected opening or closing state of the leather case or a detected opening or closing state of the flip cover.

The acceleration sensor 180E may detect accelerations in various directions (usually on three axes) of the electronic device 100. When the electronic device 100 is static, the acceleration sensor 180E may detect magnitude and a direction of gravity. The acceleration sensor 180E may be further configured to recognize a posture of the electronic device, and is applied to an application such as switching between landscape orientation and vertical orientation and a pedometer. In some optional embodiments, the acceleration sensor 180E may be configured to capture an acceleration value generated when a finger part of the user touches the display (or a finger of the user taps a rear side bezel of a side bezel of the electronic device 100), and transmit the acceleration value to the processor, so that the processor identifies a finger part through which the user inputs a user operation.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include, for example, a light emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a display for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and a touchscreen, also referred to as a "touchscreen", is formed by the touch sensor 180K and the display 194. The touch sensor 180K is configured to detect a touch operation performed on or near the touch sensor 180K. The touch operation is an operation that the user touches the display 194 by using a hand, an elbow, a stylus, or the like. The touch sensor may transfer the detected touch operation to the application processor to determine a type of a touch event. A visual output related to the touch operation may be provided on the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, or the like.

The SIM card interface 195 is configured to connect to a SIM card. The SIM card may be inserted into the SIM card interface 195 or removed from the SIM card interface 195, to implement contact with or separation from the electronic device 100.

A software system of the electronic device 100 and a software system of the electronic device 101 may use a layered architecture, an event-driven architecture, a micro-kernel architecture, a microservice architecture, or a cloud architecture. In this embodiment, an Android system is used as an example to illustrate the software structure of the electronic device 100. The ANDROID system is only a system instance of the electronic device 100 or the electronic device 101 in this embodiment. This disclosure may be further applicable to another type of operating system, like iOS, WINDOWS, and HarmonyOS. This is not limited in this application. The following uses only the ANDROID system as an example of the operating system of the electronic device 100.

Figure 3B:
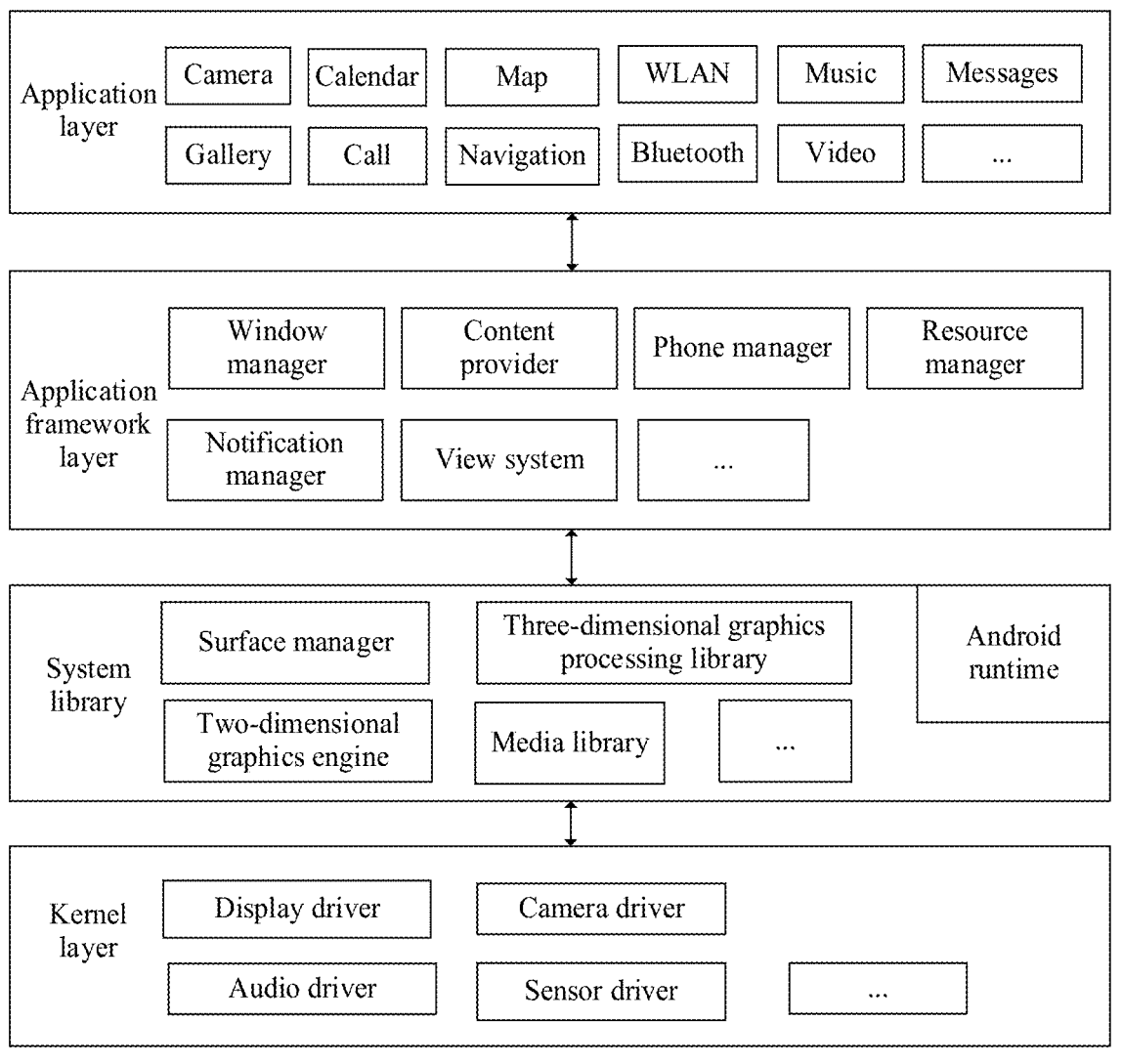
FIG. 3B is a diagram of a software structure of an electronic device according to an embodiment.

FIG. 3B is a block diagram of a software structure of the electronic device 100 according to an embodiment.

In a layered architecture, software is divided into several layers, and each layer has a clear role and task. The layers communicate with each other through a software interface. In some embodiments, the Android system is divided into four layers: an application layer, an application framework layer, an ANDROID runtime and system library, and a kernel layer from top to bottom. The application layer may include a series of application packages.

As shown in FIG. 3B, the application packages may include applications such as Camera, Gallery, Calendar, Call, Map, Navigation, WLAN, Bluetooth, Music, Videos, and Messages.

The application framework layer provides an application programming interface (API) and a programming framework for an application at the application layer. The application framework layer includes some predefined functions.

As shown in FIG. 3B, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to: store and obtain data, and enable the data to be accessed by an application.

The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an short message system (SMS) message notification icon may include a text display view and an image display view.

The phone manager is configured to provide a communication function for the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application running on the background, or may be a notification that appears on the screen in a form of a dialog window. For example, text information is displayed in the status bar, an alert sound is played, the electronic device vibrates, or the indicator light blinks.

The Android runtime includes a kernel library and a virtual machine. The Android runtime is responsible for scheduling and management of the Android system.

The kernel library includes two parts a function that needs to be called in java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional (3D) graphics processing library (for example, open graphic library embedded systems (OpenGL ES)), and a two-dimensional (2D) graphics engine (for example, simple graphics library (SGL)).

The surface manager is configured to manage a display subsystem and provide fusion of 2D and 3D layers for a plurality of applications.

The media library supports play and recording in a plurality of commonly used audio and video formats, static image files, and the like. The media library may support a plurality of audio and video encoding formats, for example, MPEG-4, advanced video coding (also called H.264), MPEG level III (MP3), advanced audio coding (AAC), adaptive multi-rate (AMR), Joint Photographic expert's Group (JPG), and portable network graphics (PNG).

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

It may be understood that the structure shown in embodiments does not constitute a specific limitation on the electronic device 100. In some other embodiments, the electronic device 100 may include more or fewer components than the components shown in the figure, some components may be combined, or some components may be split, or different component arrangements may be used. The components shown in the figure may be implemented by hardware, software, or a combination of software and hardware.

Figure 4:
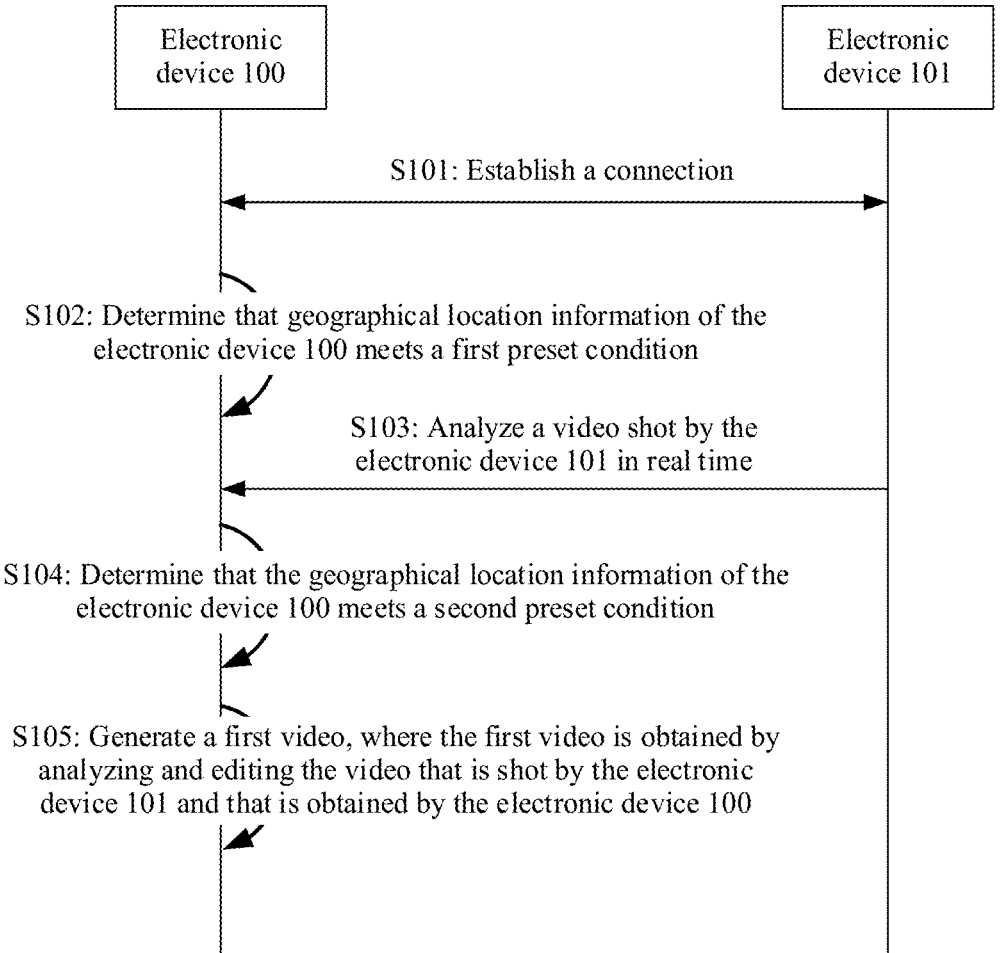
FIG. 4 is a flowchart of steps of a video generation method according to an embodiment.

Based on the foregoing system architecture and software and hardware structures, the following describes in detail a step procedure of a video generation method provided in this application. As shown in FIG. 4, FIG. 4 is an example of a flowchart of steps of a video generation method. The method may include the following steps.

S101: An electronic device 100 establishes a connection to an electronic device 101.

The electronic device 100 and the electronic device 101 may be connected in a wired or wireless communication manner. The wireless communication manner may include, for example, BLUETOOTH, NFC, Wi-Fi, or Wi-Fi direct connection. The electronic device 101 includes an electronic device having a camera, like a camera lens, a camera, a tablet computer, an iPad, or a mobile phone. In embodiments, the electronic device 100 may also be referred to as a first electronic device, and the electronic device 101 may also be referred to as a second electronic device.

In some embodiments, the electronic device 100 and the electronic device 101 may perform data communication through a server. The server may be an application server, a cloud server, a background server, or the like.

In some embodiments, when the electronic device 100 is a vehicle, the electronic device 101 may be a mobile phone, a camera, or the like. Alternatively, when the electronic device 100 is a mobile phone, the electronic device 101 may be an in-vehicle camera, another mobile phone, or the like. Optionally, the electronic device 101 may be carried on the electronic device 100. For example, the electronic device 100 is a vehicle, and the electronic device 101 is an in-vehicle camera. For another example, the electronic device 100 is a mobile phone, and the electronic device 101 is a camera on the mobile phone.

In some embodiments, the electronic device 100 and the electronic device 101 are started, the electronic device 101 may shoot pictures and/or a video, and the electronic device 100 may synchronously obtain data of the pictures and/or video shot by the electronic device 101.

In some embodiments, the electronic device 100 establishes connections to a plurality of electronic devices 101, and the electronic device 100 may synchronously obtain data of pictures or videos shot by the plurality of electronic devices 101. For example, the electronic device 100 is a vehicle, and the electronic devices 101 are an in-vehicle camera and a camera on a mobile phone.

S102: The electronic device 100 determines that geographical location information of the electronic device 100 meets a first preset condition.

The electronic device 100 obtains the geographical location information of the electronic device 100. The geographical location information may include absolute geographical location information determined by using a GPS system, for example, a longitude and latitude; or may include a geographical location area located by using a navigation system, for example, a location like a street in a district; or may include a relative location of the electronic device 100 to an initial startup location; or may include a relative location of the electronic device 100 to a preset location.

In some embodiments, the first preset condition is that a current geographical location of the electronic device 100 leaves a user resident area. The user resident area may include one or more areas. The user resident area may be a city as a minimum area, a region as a minimum area, a street as a minimum area, or the like. Optionally, the user resident area is preset by the electronic device 100, and a user may add or delete the user resident area. Optionally, the user resident area is obtained by the electronic device 100 through statistics collection based on a historical movement track of the electronic device 100. The electronic device 100 may update (add or delete) the user resident area.

Further, the first preset condition is that the current geographical location of the electronic device 100 leaves the user resident area, and leave duration exceeds a first threshold.

In some embodiments, the first preset condition is that a shortest distance between a current geographical location of the electronic device 100 and a preset location of the electronic device 100 is greater than or equal to a second threshold. For example, the second threshold is 30 km, and the preset location of the electronic device 100 is a point A. When the current geographical location of the electronic device 100 is a point B, and a distance between the point B and the point A is 30 km or greater than 30 km, the current geographical location (the point B) of the electronic device meets the first preset condition. Optionally, the preset location may be a user resident area.

In some embodiments, the first preset condition is that a current geographical location of the electronic device 100 enters a particular area, for example, a scenic spot or a tourist attraction. Optionally, the particular area is updated in real time, for example, a new scenic spot is added based on a network. Optionally, the specific area is preset by the user.

In some embodiments, the first preset condition is that a distance between a current geographical location of the electronic device 100 and an initial startup location of the electronic device 100 is greater than or equal to a third threshold. For example, the third threshold is 30 km, and the electronic device 100 starts to move from a point A. When the electronic device 100 moves to a point B, and a distance between the point B and the point A is 30 km or greater than 30 km, the current geographical location (the point B) of the electronic device meets the first preset condition.

In some embodiments, the first preset condition is that the electronic device 100 detects that the electronic device 100 enters a highway through a highway toll station. Optionally, the electronic device 100 detects, based on navigation software, that a current geographical location of the electronic device 100 passes through a highway toll station. Optionally, the electronic device 100 detects, based on a sensor, that the electronic device 100 passes through a highway toll station.

In some embodiments, the first preset condition is that the electronic device 100 receives a user confirmation instruction. When the electronic device 100 receives the user confirmation instruction, the electronic device 100 meets the first preset condition.

S103: The electronic device 100 analyzes the video shot by the electronic device 101 in real time.

When the electronic device 100 determines that the geographical location information of the electronic device 100 meets the first preset condition, the electronic device 100 analyzes the video shot by the electronic device 101 in real time.

In some application scenarios, an example in which the electronic device 100 is a head unit is used, and the electronic device 101 is an in-vehicle camera connected to the head unit. When a vehicle is started, a vehicle power supply supplies power to the head unit and the in-vehicle camera, and the in-vehicle camera may shoot a video in real time for recording. When the head unit determines that current geographical location information of the head unit meets the first preset condition, the head unit obtains the video currently shot by the in-vehicle camera in real time for analysis.

In some embodiments, when the electronic device 100 determines that the geographical location information of the electronic device 100 meets the first preset condition, the electronic device 101 starts to shoot a video, and the electronic device 100 analyzes the video shot by the electronic device 101 in real time.

In some embodiments, the electronic device 101 is shooting a video. When the electronic device 100 determines that the geographical location information of the electronic device 100 meets the first preset condition, the electronic device 100 analyzes the video shot by the electronic device 101 in real time. After the electronic device 101 performs shooting for five minutes, if the electronic device 100 detects that the geographical location information of the electronic device 100 in this case meets the first preset condition, the electronic device 100 analyzes a video that is currently shot by the electronic device 101, that is, analyzes the video that is obtained after the five minutes. For example, the electronic device 100 is a head unit, and the electronic device 101 is an in-vehicle camera. When a vehicle is started, the head unit and the in-vehicle camera are powered on, and the in-vehicle camera starts to shoot a video. When the head unit determines that geographical location information of the head unit meets the first preset condition, the head unit synchronously analyzes the video shot by the in-vehicle camera in real time.

The following describes in detail a method and a principle for analyzing, by the electronic device 100, the video shot by the electronic device 101 in real time.

The electronic device 100 synchronously obtains the video shot by the electronic device 101 in real time, selects pictures of the obtained video, and uses the selected pictures as a segment of content in a finally generated new video.

Figure 5A:
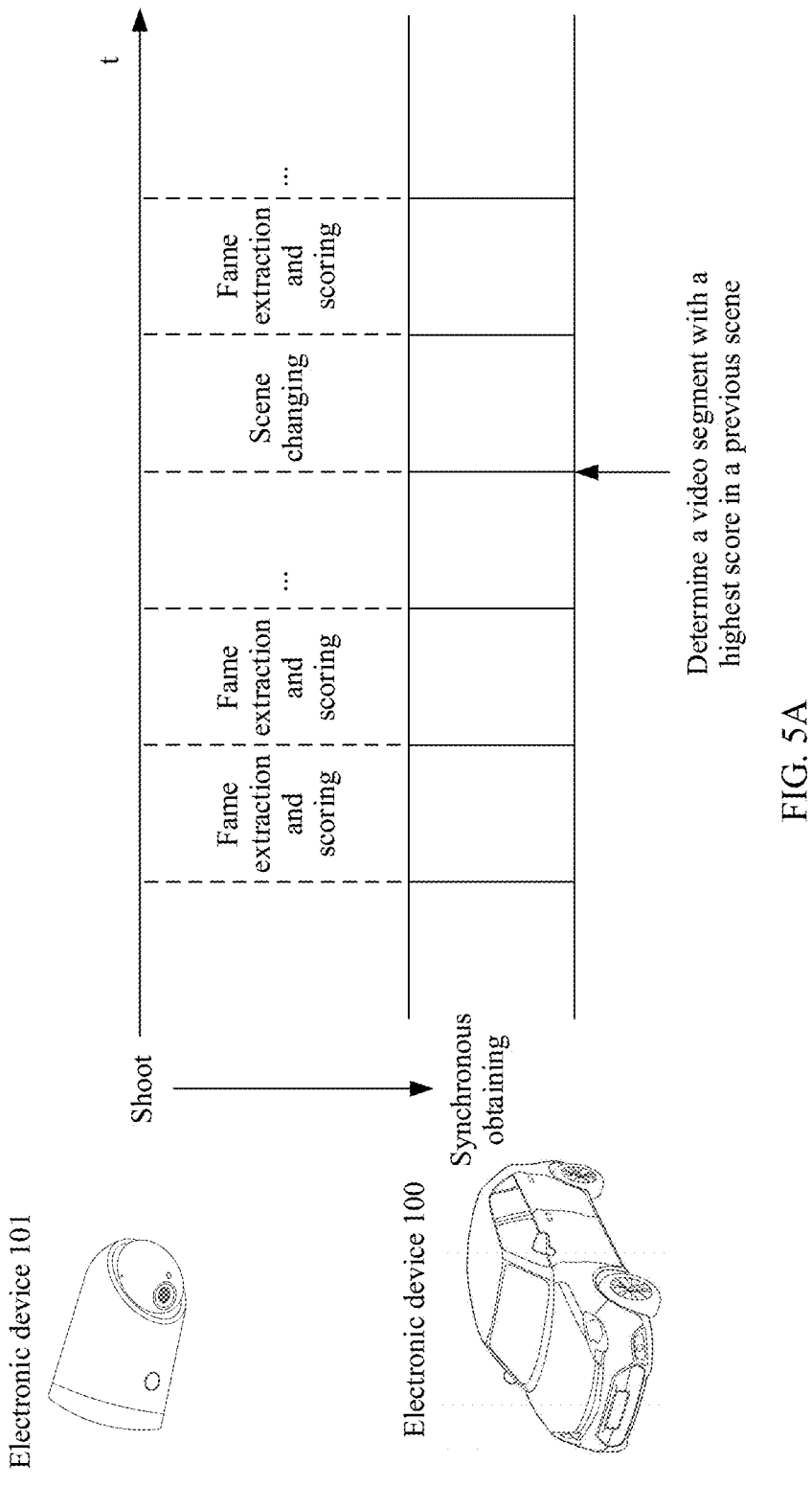
FIG. 5A to FIG. 5C are a diagram of application scenarios of a video generation method according to an embodiment.

As shown in FIG. 5A, the electronic device 100 synchronously obtains video pictures shot by the electronic device 101, and the electronic device 100 performs frame extraction on the obtained video pictures and performs scoring based on an aesthetic scoring algorithm. When detecting that a scene type in the video pictures changes, the electronic device 100 determines a video segment with a highest score in a previous scene, and then continues to perform frame extraction and scoring on a next scene until the end.

In this embodiment, the electronic device 100 selects a video picture with a highest score in real time by using a sliding window. In this way, the electronic device 100 can generate the first video when a second preset condition is met, without waiting for a long time of background analysis. In addition, when the electronic device 100 is a head unit, a requirement of the head unit on power consumption is low, and an average of 800 milliseconds (ms) to 1000 ms is consumed for analyzing each frame. This saves resources.

In some embodiments, the electronic device 100 segments obtained video data, and then selects, in a preset manner, a part of pictures from each segment of video obtained after the segmentation.

Figure 5B:
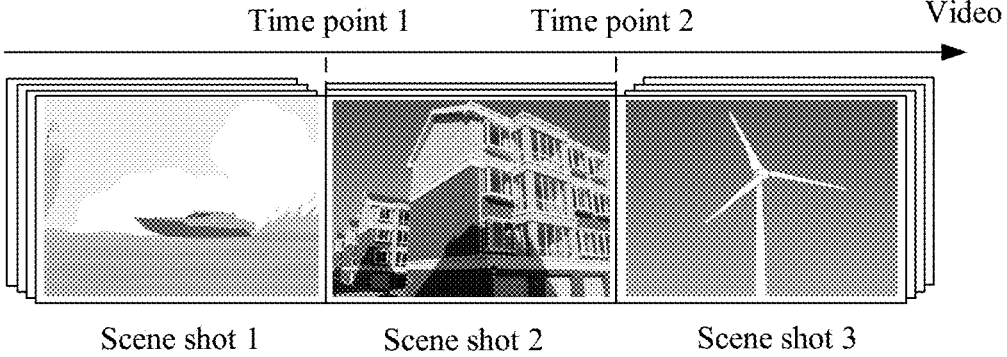

Further, a segmentation manner in which the electronic device 100 segments the obtained video data may be segmenting based on a scene shot. The scene shot includes a person shot, a scenery shot, a transition shot, and the like. FIG. 5B shows an example of a video shot by the electronic device 101 in real time. The electronic device 100 synchronously obtains the video shot by the electronic device 101. The electronic device 100 identifies image frames in the video based on an image recognition technology, to obtain different types of shots through division. FIG. 5B shows three types of scene shots, and each type of scene shot corresponds to a segment of video. Image frames in a video before a time point 1 are classified as a scene shot 1; image frames in a video between the time point 1 and a time point 2 are classified as a scene shot 2; and image frames in a video after the time point 2 are classified as a scene shot 3.

Each time the electronic device 100 obtains a segment of video through division, the electronic device 100 performs picture selection on the segment of video, and uses selected pictures as a segment of content in a finally generated new video. In some embodiments, the electronic device 100 may generate a corresponding name or a brief description for selected video pictures based on geographical location information or video content, to improve viewing experience of a user for the generated new video.

Optionally, a manner of selecting a picture may be: dividing the segment of video into several segments of videos, then performing aesthetic scoring on each of the several segments of videos, and selecting a segment of video with a highest score as a segment of content in the finally generated new video.

Optionally, a manner of selecting a picture may be: performing scene refinement on the segment of video, performing scene classification again, performing aesthetic scoring on each scene in the segment of video, and selecting a scene with a highest score as a segment of content in the finally generated new video.

Figure 5C:
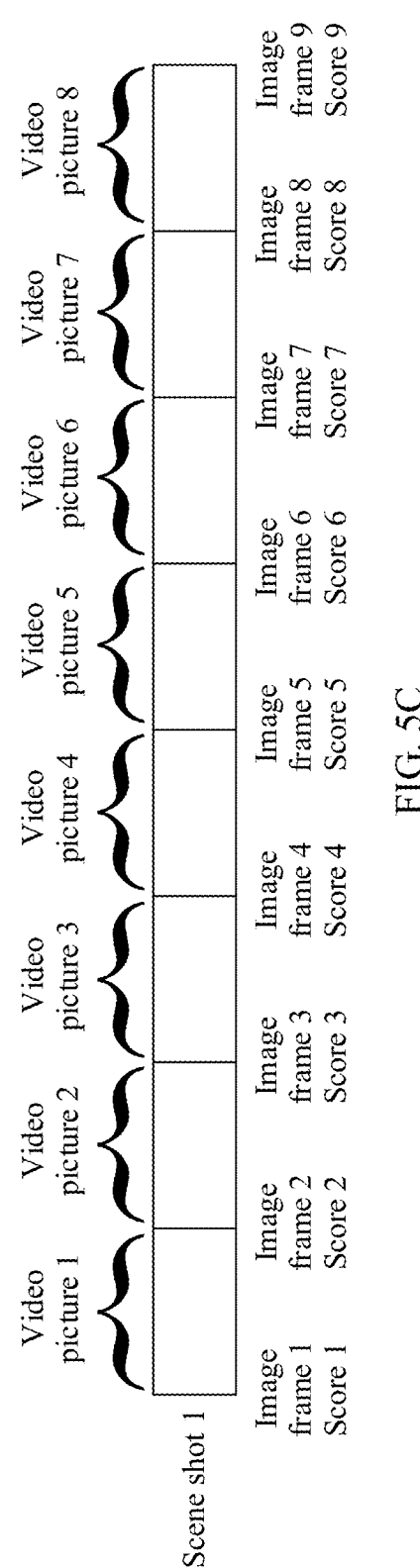

Optionally, a manner of selecting a picture may be: performing equal-interval frame extraction on the segment of video. As shown in FIG. 5C, the scene shot 1 is used as an example, and a manner of selecting a picture for one scene shot is shown as an example. In FIG. 5C, the electronic device 100 extracts nine image frames from the scene shot 1, and the nine image frames divide the scene shot 1 into eight video pictures. The electronic device 100 performs aesthetic scoring on the nine image frames, and determines a score corresponding to each image frame, to determine a score of each video picture. Optionally, the score of each video picture may be an average score of two image frames. For example, a score of a video picture 1 is an average score of an image frame 1 and an image frame 2, a score of a video picture 2 is an average score of the image frame 2 and an image frame 3, and so on. The electronic device 100 selects a video picture with a highest score as a segment of content in the finally generated new video.

Optionally, the electronic device 100 selects a video picture whose score is greater than a fourth threshold as content in the finally generated new video. In this way, a case in which no picture is selected from a segment of scene shot may occur, or a case in which a large quantity of pictures are selected from a segment of scene shot may occur.

In some embodiments, a scoring rule of aesthetic scoring may change based on a change of a scene type of a video picture. Each time the electronic device 100 obtains a video segment through division, the electronic device 100 determines a scene type of the video segment based on a current geographical location of the electronic device 100 or an image recognition technology, to determine a scoring rule corresponding to the scene type. For example, when a user is on an S101 provincial road, a landform feature is Danxia landform. In an aesthetic scoring rule, a weight of a color brightness degree and a terrain level may be increased or added. When a user is at the road around the Qiandao Lake, there are mostly reservoir area landforms of erosion and denudation of low hills. In an aesthetic scoring rule, a weight of a proportion of water, an island, and a sky may be increased or added. When a driver is driving inside a city, for example, on the viaduct on Yan' an Road, Shanghai, in an aesthetic scoring rule, a weight of a proportion of bright light, sky, and tall buildings can be increased or added. In this way, customized aesthetic scoring is performed based on accurate scenario classification. This can select a picture clip closest to public aesthetics, and improve user experience.

The foregoing process in which the electronic device 100 analyzes the video shot by the electronic device 101 in real time is synchronized with video pictures shot by the electronic device 101. The electronic device 100 synchronously receives the video pictures shot by the electronic device 101, segments the received video pictures, and captures a part of the pictures as content in the finally generated new video each time a segment is obtained through division, until the geographical location information of the electronic device 100 meets the second preset condition, and the electronic device 100 generates the first video.

S104: Determine that the geographical location information of the electronic device 100 meets the second preset condition.

In some embodiments, the second preset condition is that the current geographical location of the electronic device 100 reaches a destination. Optionally, the destination may be determined based on navigation software. The destination may also be referred to as a preset location.

Optionally, the second preset condition is that remaining time of reaching the destination from the current geographical location of the electronic device 100 is less than a fifth threshold. Optionally, the fifth threshold may be determined by navigation software.

In some embodiments, the second preset condition is that the electronic device 100 detects that within preset time, the geographical location of the electronic device 100 remains unchanged or changes within a small range.

In some embodiments, the second preset condition is that the electronic device 100 detects that the electronic device 100 leaves a highway through a highway toll station. Optionally, the electronic device 100 detects, based on navigation software, that the current geographical location of the electronic device 100 leaves the highway toll station. Optionally, the electronic device 100 detects, based on a sensor, that the electronic device 100 leaves the highway toll station.

In some embodiments, the second preset condition is that the electronic device 100 receives a user confirmation instruction. When the electronic device 100 receives the user confirmation instruction, the electronic device 100 meets the second preset condition.

S105: The electronic device 100 generates the first video, where the first video is obtained by analyzing and editing the video that is shot by the electronic device 101 and that is obtained by the electronic device 100.

After the electronic device 100 determines that the geographical location information of the electronic device 100 meets the second preset condition, the electronic device 100 no longer analyzes content of the video shot by the electronic device 101, and the electronic device 100 generates the first video (a new video) based on previously obtained video content. The first video is obtained by performing analysis and editing based on the video content obtained by the electronic device 100.

In some embodiments, the electronic device 100 synchronously receives the video pictures shot by the electronic device 101, segments the received video pictures, and captures a part of the pictures as content in the finally generated new video each time a segment is obtained through division, until the geographical location information of the electronic device 100 meets the second preset condition, and the electronic device 100 generates the new video.

Figure 6:
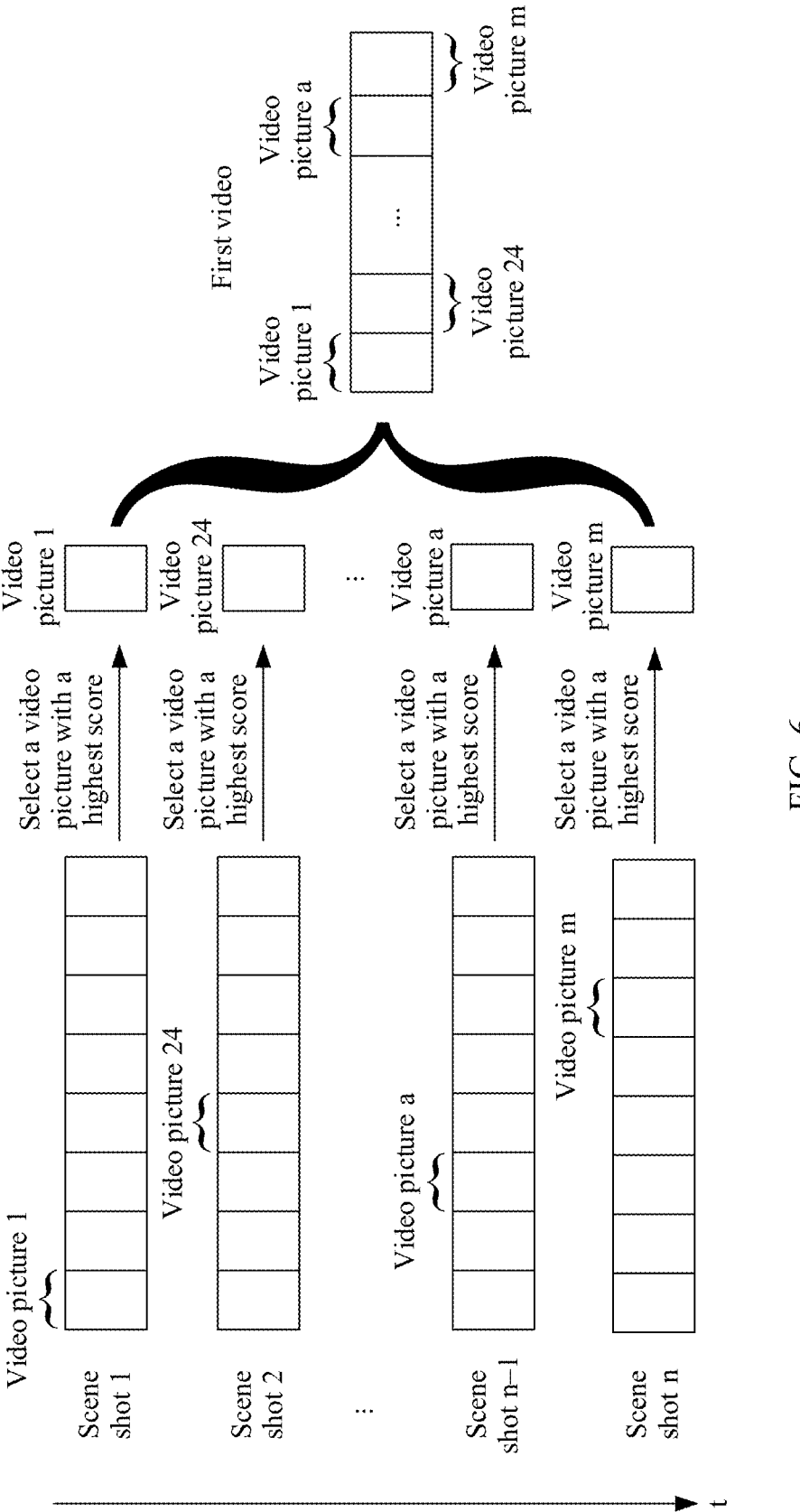
FIG. 6 is a diagram of an application scenario of a video generation method according to an embodiment.

For example, as shown in FIG. 6, after the electronic device 100 determines that the geographical location information of the electronic device 100 meets the first preset condition, the electronic device 100 synchronously receives the video pictures shot by the electronic device 101, obtains the scene shot 1 through division, and selects the video picture 1 with a highest score from the scene shot 1; the electronic device 100 continuously receives the video pictures shot by the electronic device 100, obtains a scene shot 12 through division, and selects a video picture 24 with a highest score from the scene shot 2, and in this case, may splice the video picture 1 and the video picture 2 together; the electronic device 100 continuously receives the video pictures shot by the electronic device 100, obtains a scene shot n−1 through division, and selects a video picture a with a highest score from the scene shot n−1, and in this case, may splice the video picture a and a video picture selected from a scene shot n−2 together; and the electronic device 100 continuously receives the video pictures shot by the electronic device 100, and after the electronic device 100 determines that the geographical location information of the electronic device 100 meets the second preset condition, the electronic device 100 obtains a last scene shot n through division, selects a video picture m with a highest score from the scene shot n, and in this case, may splice the video picture m and the video picture a together. In this case, the electronic device 100 generates the first video, where the first video is obtained by splicing n video pictures. Optionally, a transition animation or a transition picture may be inserted between all video pictures in the first video. Optionally, more than one video picture may be selected from each scene shot, or no video picture may be selected.

In some embodiments, the electronic device 100 generates the first video, and saves the first video. The user may view and play the first video on the electronic device 100.

In some embodiments, the electronic device 100 generates the first video, and generates, based on the geographical location information of the electronic device 100 or video content of the first video, a video name for the first video, for example, a rich and colorful customized name like a trip to Erhai in Yunnan and a trip around Qiandao Lake. This resolves a problem that a name of a video in an album in a current gallery is monotonous, and enriches an ecosystem of recording life for the user in the gallery.

Figure 7:
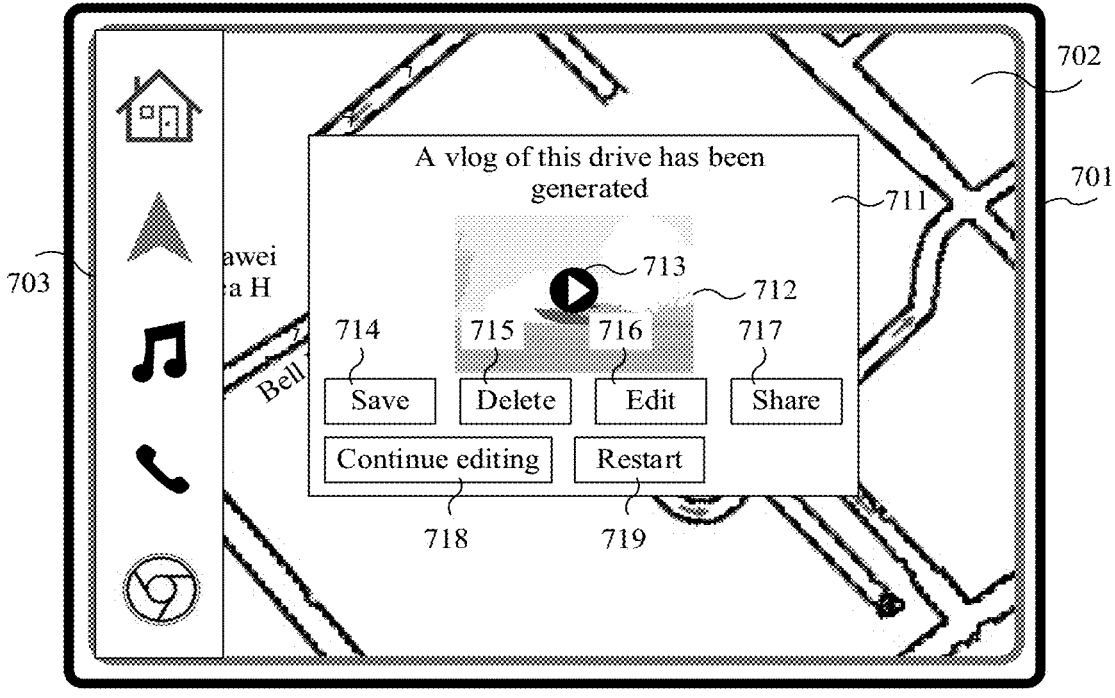
FIG. 7 is a diagram of an application interface that is of a video generation method and that is on a head unit according to an embodiment.

In some embodiments, after the electronic device 100 generates the first video, the electronic device 100 outputs prompt information. The prompt information is used to: inform the user that the first video is generated and provide a manner of processing the first video, including saving the first video, deleting the first video, editing the first video, sharing the first video to an application, sending the first video to another device, and the like. For example, as shown in FIG. 7, the electronic device 100 is a head unit, and FIG. 7 shows an application interface 701 in a navigation application after the electronic device 100 generates the first video. The application interface 701 includes a navigation map 702, a toolbar 703, and prompt information 711 generated for the first video.

The toolbar 703 includes one or more functional controls, and provides functions such as making a call and playing music.

The prompt information 711 prompts the user that the first video is generated (FIG. 7 shows that "A vlog of this drive has been generated"). The prompt information 711 includes a thumbnail 712 of the first video, a play control 713, a save control 714, a delete control 715, an edit control 716, a share control 717, a continue editing control 718, and a restart control 719.

The play control 713 is used to play the first video.

The save control 714 is used to save the first video to the electronic device 100.

The delete control 715 is used to delete the first video.

The edit control 716 is used to edit the first video, including, for example, changing a sequence of video pictures in the first video, deleting a part of pictures in the first video, inserting a transition animation between two video pictures, adding a text, a sticker, a watermark, or the like, adding background music, and editing a video name of the first video.

The share control 717 is used to send the first video to another device or share the first video to an application.

The continue editing control 718 is used to indicate the electronic device 100 to continue to receive and analyze video pictures shot by the electronic device 101 in real time, and regenerate a first video. The continue editing control may be applied to a case in which the electronic device 100 incorrectly determines that the electronic device 100 meets the second preset condition. In this case, the user may select the electronic device 100 to continue to analyze and edit video pictures shot by the electronic device 101 in real time. Alternatively, when the user wants to edit video content of two drives into a vlog, the user may select the electronic device 100 to continue to analyze and edit video pictures shot by the electronic device 101 in real time.

The restart control 719 is used to indicate the electronic device 100 to delete the first video, and re-receive and analyze video pictures shot by the electronic device 101 in real time. Optionally, after generating the first video, the electronic device 100 sends the first video to another electronic device.

After the electronic device 100 determines that the geographical location information of the electronic device 100 meets the second preset condition, the electronic device 100 generates the first video and sends the first video to another electronic device. The another electronic device may include the electronic device 101, or may be another electronic device that establishes a connection to the electronic device 100.

Figure 8:
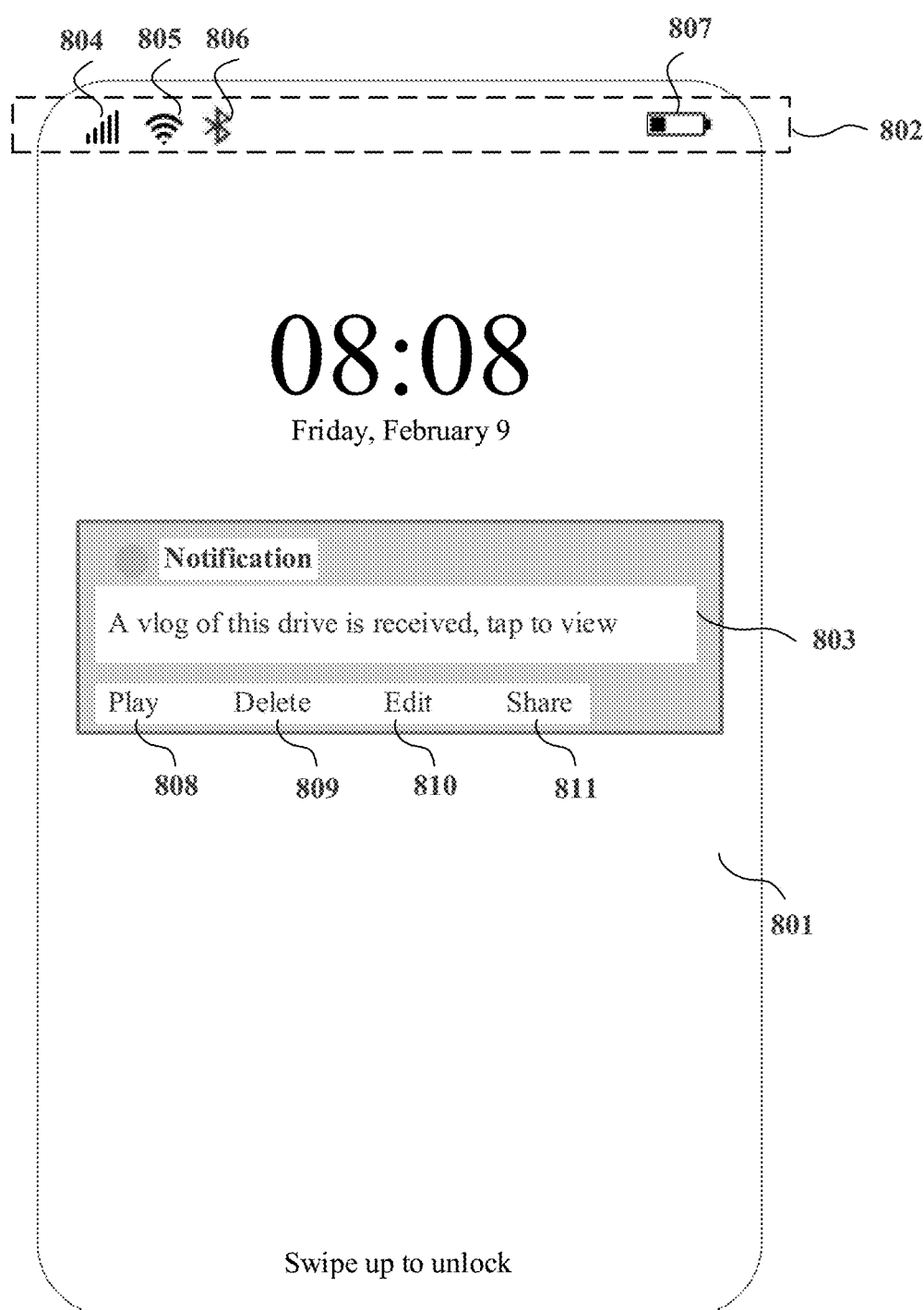
FIG. 8 is a diagram of an application interface that is of a video generation method and that is on a mobile phone according to an embodiment.

In some embodiments, the another electronic device receives the first video, and the another electronic device outputs prompt information. The prompt information is used to: prompt the user that the first video is received, and provide a manner of processing the first video, including confirming receiving of the first video, saving the first video, deleting the first video, editing the first video, sharing the first video to an application, and the like. For example, as shown in FIG. 8, another electronic device that receives the first video is a mobile phone. FIG. 8 shows an example of a lock screen interface 801. The mobile phone receives, in a screen-locked state, the first video sent by the electronic device 100, and the mobile phone outputs prompt information. The lock screen interface 801 shown in FIG. 8 includes a status bar 802 and a notification 803 (prompt information).

The status bar 802 may include one or more signal strength indicators 804 for a mobile communication signal (which may also be referred to as a cellular signal), one or more signal strength indicators 805 for a Wi-Fi signal, a BLUETOOTH indicator 806, and a battery status indicator 807. When a BLUETOOTH module of an electronic device is in an enabled state (that is, the electronic device supplies power to the BLUETOOTH module), the BLUETOOTH indicator 806 is displayed on a display interface of the electronic device.

The notification 803 prompts the user that the first video is received (which is shown in FIG. 8 as "A vlog of this drive is received, tap to view"). The prompt information notification 803 includes a play control 808, a delete control 809, an edit control 810, and a share control 811.

The play control 808 is used to play the received first video.

The delete control 809 is used to delete the first video.

The edit control 810 is used to edit the first video, including, for example, changing a sequence of video pictures in the first video, deleting a part of pictures in the first video, inserting a transition animation between two video pictures, adding a text, a sticker, a watermark, or the like, and adding background music.

The share control 811 is used to send the first video to another electronic device or share the first video to an application.

In this embodiment, the electronic device 100 determines, based on a geographical location of the electronic device 100, analysis start time and analysis end time of video pictures. When the geographical location of the electronic device 100 meets the first preset condition, the electronic device 100 starts to analyze and edit data of a video shot by the electronic device 101 in real time. In other words, the electronic device 101 shoots a video, and the electronic device 100 synchronously analyzes and edits the video. When the geographical location of the electronic device 100 meets the second preset condition, the electronic device 100 generates the first video, and no longer analyzes and edits data of a video shot by the electronic device 101 subsequently. The first video is obtained by performing analysis and editing based on video content obtained by the electronic device 100. In this way, a manner in which the electronic device 100 synchronously analyzes content of a video shot in real time can improve video generation efficiency and reduce waiting time of a user.

For example, the electronic device 100 is a head unit, and the electronic device 101 may be a device having a camera, like an in-vehicle camera or a mobile phone. When the user drives a vehicle on which the electronic device 100 is carried, the electronic device 101 may shoot a roadside scenery in a driving process in real time. In this case, the electronic device 100 may synchronously analyze and edit data of a video or pictures shot in real time. After the driving ends, the electronic device 100 may generate a travel video about the driving process. The electronic device 100 may send the video to another electronic device.

In some application scenarios, the electronic device 100 is a head unit, and the electronic device 101 may be a camera on a mobile phone. The mobile phone may shoot a roadside scenery in a driving process in real time. After the driving ends, the electronic device 100 may generate a travel video about the driving process. The electronic device 100 may send the video to another electronic device, for example, a mobile phone.

In some application scenarios, the electronic device 100 is a mobile phone, and the electronic device 101 may be an in-vehicle camera. The in-vehicle camera may shoot a roadside scenery in a driving process in real time. After the driving ends, the mobile phone may generate a travel video about the driving process.

In some embodiments, the electronic device 101 includes a plurality of electronic devices. For example, the electronic device 100 is a head unit, and the electronic device 101 may be an in-vehicle camera and a camera on a mobile phone, that is, the electronic device 100 may receive data of videos shot by the plurality of electronic devices 101 in real time. Optionally, the electronic device 100 may perform analysis based on a plurality of segments of video data obtained in a same time period, and select a plurality of segments of video content in the plurality of segments of videos and splice the plurality of segments of video content together.

In the foregoing embodiments, an example in which the electronic device 101 shoots a video is used. Not limited to video data, the electronic device 101 may further shoot an image, and the electronic device 100 may synchronously obtain data of images shot by the electronic device 101 in real time. In some embodiments, the electronic device 100 obtains the data of images shot by the electronic device 101 in real time. When the geographical location of the electronic device 100 meets the first preset condition, the electronic device 100 starts to analyze and edit the data of images shot by the electronic device 101 in real time. That is, the electronic device 101 takes images, and the electronic device 100 synchronously analyzes and edits the received images.

For example, the electronic device 100 performs scenario classification on a series of shot images, and selects a part of images from images in each scenario as a part of content in a finally generated video. A selection manner includes, for example, selecting a photo with a high score based on an aesthetic scoring algorithm. Further, before performing aesthetic scoring, the electronic device 100 selects, based on an image recognition technology, photos with a high repetition rate, and selects one or more of the photos (for example, one with a highest aesthetic score) for retention.

For example, the electronic device 100 first determines a quantity n of required images, the electronic device 100 performs aesthetic scoring on each received image, and the top n images are used as content in the finally generated video.

When the geographical location of the electronic device 100 meets the second preset condition, the electronic device 100 generates the first video, and no longer analyzes and edits data of images shot by the electronic device 101 subsequently. The first video is obtained by performing analysis and editing based on images obtained by the electronic device 100. In this way, a manner in which the electronic device 100 synchronously analyzes images shot in real time can improve video generation efficiency and reduce waiting time of a user.

In some embodiments, the electronic device 100 may obtain data of images and data of a video that are sent by the electronic device 101. When the geographical location of the electronic device 100 meets the first preset condition, the electronic device 100 starts to analyze and edit the data of images and the data of a video shot by the electronic device 101 in real time. In other words, the electronic device 101 shoots the images and the video, and the electronic device 100 synchronously analyzes and edits the received data of the images and the received data of the video. When the geographical location of the electronic device 100 meets the second preset condition, the electronic device 100 generates the first video, and no longer analyzes and edits data of images and data of a video shot by the electronic device 101 subsequently.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this disclosure are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the processes of the methods in embodiments may be implemented by a computer program instructing relevant hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

What is claimed is:

1. A method, comprising:
  determining, by a first electronic device, that geographical location information of the first electronic device meets a first preset condition;
  obtaining, by the first electronic device and when the geographical location information meets the first preset condition, a video and/or images shot by a second electronic device in real time, wherein the first electronic device is connected to the second electronic device;
  selecting, by the first electronic device, a part of pictures in the video and/or the images; and
  generating, by the first electronic device, a first video by splicing the part when the geographical location information meets a second preset condition.

2. The method of claim 1, wherein the first preset condition comprises being outside a user resident area.

3. The method of claim 1, wherein the first preset condition comprises being outside a user resident area for longer than a threshold time.

4. The method of claim 1, wherein the first preset condition comprises being greater than a threshold distance away from a user resident area.

5. The method of claim 1, wherein the first preset condition comprises being within a particular area.

6. The method of claim 1, wherein selecting, by the first electronic device, the part comprises:
  segmenting, by the first electronic device, the video and/or the images to obtain a segmented video and/or segmented images;
  scoring, by the first electronic device based on an aesthetic scoring algorithm, the segmented video and/or the segmented images; and
  selecting a picture with a highest score in each segment of the segmented video and/or the segmented images as the part.

7. The method of claim 6, wherein a score weight of the aesthetic scoring algorithm is associated with a scene type of the segmented video and/or the segmented images.

8. The method of claim 1, wherein the second preset condition comprises entering a preset location.

9. The method of claim 1, wherein the second preset condition comprises a remaining time to reach a preset destination from a current geographical location being less than a fifth threshold.

10. The method of claim 1, further comprising outputting, after the generating, first prompt information, wherein the first prompt information provides an editing mode for the first video, and wherein the editing mode comprises playing the first video, saving the first video, deleting the first video, adjusting a sequence of display pictures in the first video, deleting a part of the display pictures in the first video, inserting a transition animation between the display pictures in the first video, adding text, adding a sticker, adding a watermark, or adding background music.

11. The method of claim 1, further comprising generating, by the first electronic device, a video name of the first video based on the geographical location information.

12. The method of claim 1, further comprising generating, by the first electronic device, a video name of the first video based on video content of the first video.

13. The method of claim 1, further comprising sending, by the first electronic device, the first video to a second electronic device.

14. A first electronic device comprising:
  a non-volatile memory configured to store computer-executable instructions; and
  one or more processors coupled to the non-volatile memory and configured to execute the computer-executable instructions to cause the first electronic device to:
    determine that geographical location information of the first electronic device meets a first preset condition;
    obtain, when the geographical location information meets the first preset condition, a video and/or images shot by a second electronic device in real time, wherein the first electronic device is connected to the second electronic device;
    select a part of pictures in the video and/or the images; and
    generate a first video, when the geographical location information of the first electronic device meets a second preset condition, wherein the first video is formed by splicing the part of pictures.

15. The first electronic device of claim 14, wherein the first preset condition comprises:

being outside a user resident area;

being outside a user resident area for longer than a threshold time;

being greater than a threshold distance away from a user resident area; or being within a particular area.

16. The first electronic device of claim 14, wherein the one or more processors are further configured to execute the computer-executable instructions to cause the first electronic device to select the part by:

segmenting, by the first electronic device, the video and/or the images to obtain a segmented video and/or segmented images;

scoring, by the first electronic device based on an aesthetic scoring algorithm, the segmented video and/or the segmented images; and selecting a picture with a highest score in each segment of the segmented video and/or the segmented images as the part.

17. The first electronic device of claim 14, wherein the second preset condition comprises:

a current geographical location of the first electronic device entering a preset location; or a remaining time to reach a preset destination from a current geographical location of the first electronic device being less than a fifth threshold.

18. A computer program product comprising instructions that are stored on a non-transitory medium and that, when executed by one or more processors, cause a first electronic device to:

determine that geographical location information of the first electronic device meets a first preset condition;

obtain, when the geographical location information meets the first preset condition, a video and/or images shot by a second electronic device in real time, wherein the first electronic device is connected to the second electronic device;

select a part of pictures in the video and/or the images; and generate a first video when the geographical location information of the first electronic device meets a second preset condition, wherein the first video is formed by splicing the part of pictures.

19. The computer program product of claim 18, wherein the first preset condition comprises being outside a user resident area.

20. The computer program product of claim 18, wherein the instructions, when executed by the one or more processors, cause the first electronic device to:

segment the video and/or the images to obtain a segmented video and/or segmented images;

score, based on an aesthetic scoring algorithm, the segmented video and/or the segmented images; and select a picture with a highest score in each segment of the segmented video and/or the segmented images as the part.

* * * * *